Patented Oct. 6, 1942

2,298,066

UNITED STATES PATENT OFFICE 2,298,066

MINERAL OIL GELS

Winton I. Patnode, Schenectady, N. Y., assignor to General Electric Company, a corporation of New York No Drawing. Original application May 28, 1938, Serial No. 210,798. Divided and this application April 1, 1941, Serial No. 386,307

7 Claims. (Cl. 260—32)

The present invention comprises petroleum oil compositions which are characterized by being liquid when in a formative state and of being convertible to semi-solid, elastic gels which are capable of retaining their semi-solid condition when heated to elevated temperatures.

This application is a division of my copending application, Serial No. 210,798, filed May 28, 1938. That application contains claims to gels comprising liquid chlorinated aromatic compounds and certain esters of acrylic acid or α-substituted acrylic acids. The present application is concerned specifically with the mineral oil gels described in this above-identified copending application.

Compositions embodying my invention are suitable for casting or pouring into intricate forms or crevices and are suitable for various uses, for example as insulating and dielectric elements in transformers, capacitors, electrical terminals or bushings, cables, or other electric devices; for lubricating purposes; for the manufacture of inking rollers and pads; for vibration dampers; for sealing purposes; and for charging or filling artillery projectiles with materials which would affect the trajectory of the shell if in liquid form.

Gels, heretofore, have been made by adding a gelling agent to a relatively large volume of liquid at an elevated temperature, the gel being formed when the composition cools. An example is the addition of a soap to non-heat-convertible oil, such as mineral oil. Such gels, when reheated, melt or soften and lose their gel characteristics.

It has been proposed also to add to such oil, substances such as resins or unsaturated compounds which are capable of being converted to a resinous state by heating. The products, however, have the properties of highly viscous liquids. Gels have distinctive elastic properties and do not change their configuration by liquid flow.

In accordance with my present invention, a desired liquid component is associated with a synthetic organic compound capable of polymerization by virtue of at least two double bonds in the molecule, the proportions being such that upon polymerization an elastic stable gel is formed, which, when heated short of a decomposition temperature, or boiling point of one of the components, does not reliquefy, but on the contrary, retains the distinctive elastic properties of gels.

Examples of such multiple double bonded gelling agents are derivatives of acrylic acid or alpha substituted acrylic acid, such as the esters of such acids formed by combination with polyhydric alcohol, an example being ethylene glycol dimethacrylate. Another type of compound that may be used for this purpose are hydrocarbons containing at least two activated vinyl groups, such as divinyl benzene and divinyl acetylene; and vinyl esters of polybasic acids, such as divinyl succinate, divinyl sebacate, and divinyl maleate. Other such compounds that contain at least two activated double bonds per molecule will suggest themselves to those skilled in the art of resin-formation. Among these are such compounds as the allyl esters and α-methallyl esters of acrylic acid and α-substituted acrylic acids. The allyl and methallyl esters of maleic acids, as well as the glycol esters of maleic acid also are suitable.

Exampes of liquids suitable for the formation of gels when thus associated with a polymerizable gelling agent are toluene, xylene, butyl alcohol, ethylene glycol, dichlorethylene, trichlorbenzene, penta-chlorodiphenyl, acetonyl acetone, dibutyl phthalate, glacial acetic acid, diamyl phthalate, butyl benzoyl benzoate, ethyl toluene sulphonamide, diphenyl orthodiphenyl phosphate, dibenzyl sebacate, ethyl recinoleate, α-dichlorhydrin, and petroleum oils.

It is usually advantageous to include in the gelling agent a quantity of a compound that is capable of polymerization by virtue of a molecular structure providing but one active double bond, as well as one or more compounds which contain at least two active double bonds, since the gels so formed are usually tougher and more transparent. It is desirable, although not necessary, to employ a catalyst, such as benzoyl peroxide.

Some of the gels embodying my invention are tough, elastic, and transparent products, while others are translucent or opaque and rigid, the consistency and appearance of the gel depending upon the proportions and nature of the gelling agents.

Following are specific examples illustrative of my invention, although my invention should not be considered as being limited to these particular examples. The proportions given are by volume, except that the proportion of the catalyst (benzoyl peroxide) is by weight, being 1 gram per 100 cc. of gelling agent.

Example 1

A composition of the following ingredients, when heated for about 43 hours at 50° C., results in a water-white, transparent, elastic gel which does not flow under its own weight at 100° C.

Ethyl toluene sulphonamide_____ 20
Ethylene glycol dimethacrylate_____ 1
Benzoyl peroxide_____ 0.01

Elastic, non-fusible gel compositions may be formed in which the preponderant liquid ingredient is a liquid chlorinated hydrocarbon, such as the following four examples:

Example 2

A composition of the following ingredients, when heated for about 80 hours at 50° C. and for about 22 hours at 75° C., results in a translucent, elastic gel that does not melt at 100° C.

| | |
|---|---|
| Pentachlorodiphenyl | 20 |
| Allyl methacrylate | 2 |
| Benzoyl peroxide | 0.03 |

Example 3

A composition of the following ingredients, when heated first for about 21 hours at 50° C. and then for about 20 hours at 70° C., results in a transparent, water-white, elastic gel that does not melt at 100° C.

| | |
|---|---|
| Trichlorbenzene | 18 |
| Ethyl acrylate | 1.9 |
| Methallyl methacrylate | 0.1 |
| Benzoyl peroxide | 0.02 |

Example 4

A composition of the following ingredients, when heated first for about 24 hours at 50° C. and then heated for about 24 hours at 75° C., results in a transparent, elastic gel that does not melt at 100° C.

| | |
|---|---|
| Pentachlorodiphenyl | 18 |
| Styrene | 1.9 |
| Glycol dimethacrylate | 0.1 |
| Benzoyl peroxide | 0.02 |

Example 5

A composition of the following ingredients, when heated first for 17 hours at 50° C., and then heated for about 5 hours at 70° C., results in a transparent, elastic gel that does not melt at 100° C.

| | |
|---|---|
| Trichlorbenzene | 18 |
| Methyl methacrylate | 1.9 |
| Glycol dimethacrylate | 0.1 |
| Benzoyl peroxide | 0.02 |

The following four compositions, when heated for 24 hours at 50° C. and heated thereupon for 24 hours at 75° C. result in elastic gels:

Example 6

| | |
|---|---|
| Petroleum base cable oil | 16 |
| 2-ethyl hexyl methacrylate | 3.8 |
| Glycol dimethacrylate | 0.2 |
| Benzoyl peroxide | 0.04 |

Example 7

| | |
|---|---|
| Tricresyl phosphate | 16 |
| Isobutyl methacrylate | 3.8 |
| Methallyl methacrylate | 0.2 |
| Benzoyl peroxide | 0.04 |

Example 8

| | |
|---|---|
| Dibutyl phthalate | 15 |
| Methyl acrylate | 3.75 |
| Diethylene glycol maleate | 1.75 |
| Benzoyl peroxide | 0.05 |

Example 9

| | |
|---|---|
| Tricresyl phosphate | 15 |
| Butyl methacrylate | 3.75 |
| Diallyl maleate | 1.25 |
| Benzoyl peroxide | 0.05 |

Example 10

The following ingredients, when heated for about 24 hours at 50° C. and thereupon for about 20 hours at 75° C., become gelled, forming an elastic, translucent body.

| | |
|---|---|
| Ethyl cellulose | 7.2 |
| N-butanol | 13.8 |
| Trichlorbenzene | 69.0 |
| Glycol dimethacrylate | 0.5 |
| Isobutyl methacrylate | 9.5 |
| Benzoyl peroxide | 0.01 |

It should be noted that in these examples only a minor proportion of gelling agent is required, usually less than about 20 per cent by volume. It should also be noted that the proportion of the total gelling agent which is responsible for the unique properties of the resulting gels constitutes often not more than one-half of one per cent of the total volume of the gel.

All of the above examples include benzoyl peroxide as catalyst. It is not necessary to use such a catalyst, but in the absence of a catalyst the time required for the formation of gel is greater, or the temperature must be higher to produce the gel in a shorter time. This will be apparent to those skilled in the art of resin formation by polymerization.

It is not necessary that the inert liquid should consist of a single chemical compound. Mixtures of liquids or solutions of solids in liquids also may be used, as in Example 10 above. In some cases it may be advantageous to incorporate solid fillers, such as graphite, silica, and pigments in the composition, and it is understood that the composition of the inert liquid may vary widely without departing from the spirit and scope of this invention.

What I claim as new and desire to secure by Letters Patent of the United States is:

1. A stable, non-fusible, elastic gel composition comprising a heat treated mixture of at least 80 per cent by volume of petroleum oil and a minor portion of a polymerizable ester of an acid selected from the group consisting of acrylic acid and α-substituted acrylic acids having at least two polymerizable double bonds in the molecule.

2. A composition comprising a heat treated mixture of at least 80 per cent by volume of petroleum oil and a resinifiable component consisting of a plurality of synthetic polymerizable compounds, at least one of which is a methacrylate ester capable of polymerizing by virtue of two polymerizable double bonds in the molecule.

3. A composition comprising a heat treated mixture of at least 80 per cent by volume of petroleum oil and a polymerizable component consisting of a plurality of methacrylate esters, at least one of which is a methacrylate ester capable of polymerizing by virtue of two polymerizable double bonds in the molecule.

4. A composition comprising a heat treated product of a mixture of petroleum oil and less than 20 per cent by volume of a mixture of polymerizable compounds consisting of glycol dimethacrylate and an ester of methacrylic acid containing only one double bond in the molecule.

5. A composition capable of forming a non-fusible stable gel on heating comprising at least 80 per cent by volume petroleum oil, 2-ethyl hexyl methacrylate, and an ester of methacrylic acid capable of polymerizing by virtue of two double bonds in the molecule.

6. A stable non-fusible gel consisting of a heat treated mixture consisting by volume of about 16 parts petroleum oil, 3.8 parts 2-ethyl hexyl methacrylate, and 0.2 parts glycol dimethacrylate in the presence of a polymerization catalyst.

7. A composition capable of forming a non-fusible gel on heating under polymerizing conditions consisting by volume of about 16 parts petroleum oil, 3.8 parts 2-ethyl hexyl methacrylate, and 0.2 parts glycol dimethacrylate.

WINTON I. PATNODE.